(12) United States Patent
Tojo et al.

(10) Patent No.: US 8,078,908 B2
(45) Date of Patent: Dec. 13, 2011

(54) DATA STORAGE DEVICE AND METHOD

(75) Inventors: Mihoko Tojo, Kawasaki (JP); Hidefumi Kobayashi, Kawasaki (JP); Yusuke Oota, Kawasaki (JP); Satoshi Hayashi, Kawasaki (JP); Keiichi Umezawa, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/778,386

(22) Filed: May 12, 2010

(65) Prior Publication Data

US 2010/0299558 A1    Nov. 25, 2010

(30) Foreign Application Priority Data

May 19, 2009   (JP) ................. 2009-121327

(51) Int. Cl.
*G06F 11/00* (2006.01)
(52) U.S. Cl. .......................... 714/14; 714/24
(58) Field of Classification Search .................. 714/14, 714/24
See application file for complete search history.

(56) References Cited

U.S. PATENT DOCUMENTS

| | | | | |
|---|---|---|---|---|
| 5,204,963 A * | 4/1993 | Noya et al. ................. 365/229 | | |
| 5,694,538 A | 12/1997 | Okazaki et al. | | |
| 7,100,080 B2 * | 8/2006 | Howe ............................. 714/24 | | |
| 7,487,391 B2 * | 2/2009 | Pecone et al. .................. 714/14 | | |
| 2009/0198931 A1 * | 8/2009 | Ohyama et al. ............... 711/162 | | |
| 2010/0257385 A1 * | 10/2010 | Hutchison et al. ............ 713/310 | | |
| 2011/0010499 A1 * | 1/2011 | Tsukamoto et al. ........... 711/118 | | |
| 2011/0126046 A1 * | 5/2011 | Hoang ........................... 714/14 | | |

FOREIGN PATENT DOCUMENTS

| | | |
|---|---|---|
| JP | 6-231053 A | 8/1994 |
| JP | 8-272698 A | 10/1996 |
| JP | 2009-187062 A | 8/2009 |

* cited by examiner

*Primary Examiner* — Christopher McCarthy
(74) *Attorney, Agent, or Firm* — Fujitsu Patent Center

(57) ABSTRACT

An apparatus includes a cache memory for storing user data and control information of the apparatus, a nonvolatile memory and a processor for executing a process including when the power failure occurs, saving the user data and the control information stored in the cache memory into the nonvolatile memory, when the power failure recovers, restoring the data stored in the nonvolatile memory into the cache memory, and erasing the data stored in the nonvolatile memory after restoring the data into the cache memory and when another power failure occurs during erasing the data stored in the nonvolatile memory, erasing the control information stored in the nonvolatile memory if the control information is remained in the nonvolatile memory and saving, into the nonvolatile memory, the updated control information stored in the cache memory and the user data which has been erased from the nonvolatile memory.

7 Claims, 18 Drawing Sheets

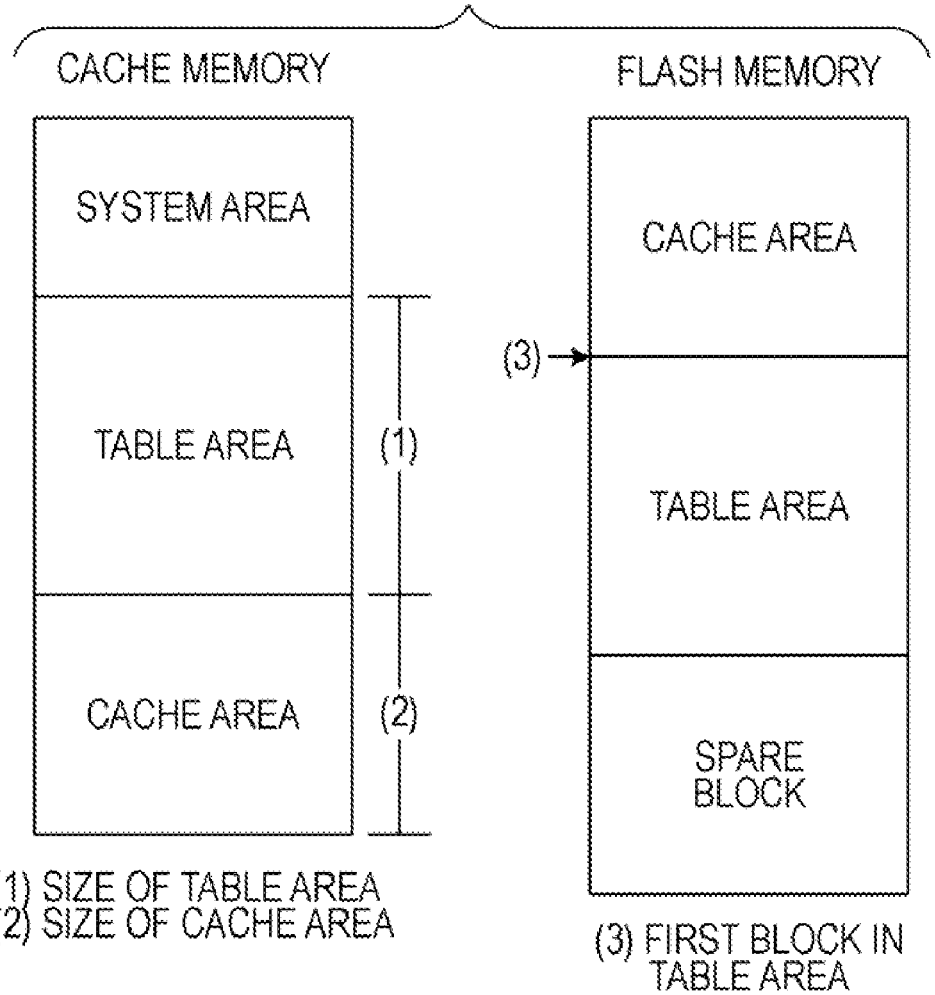

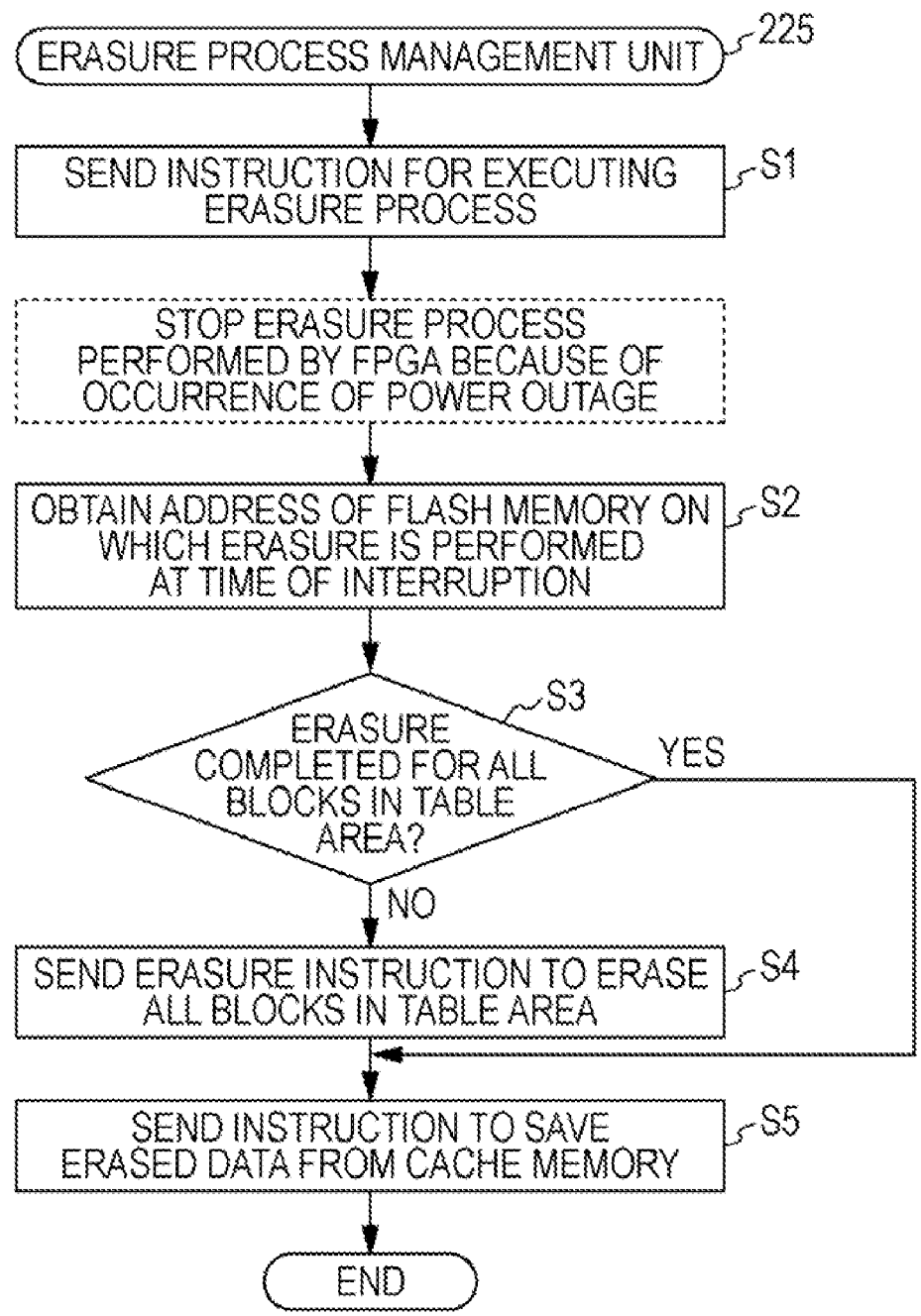

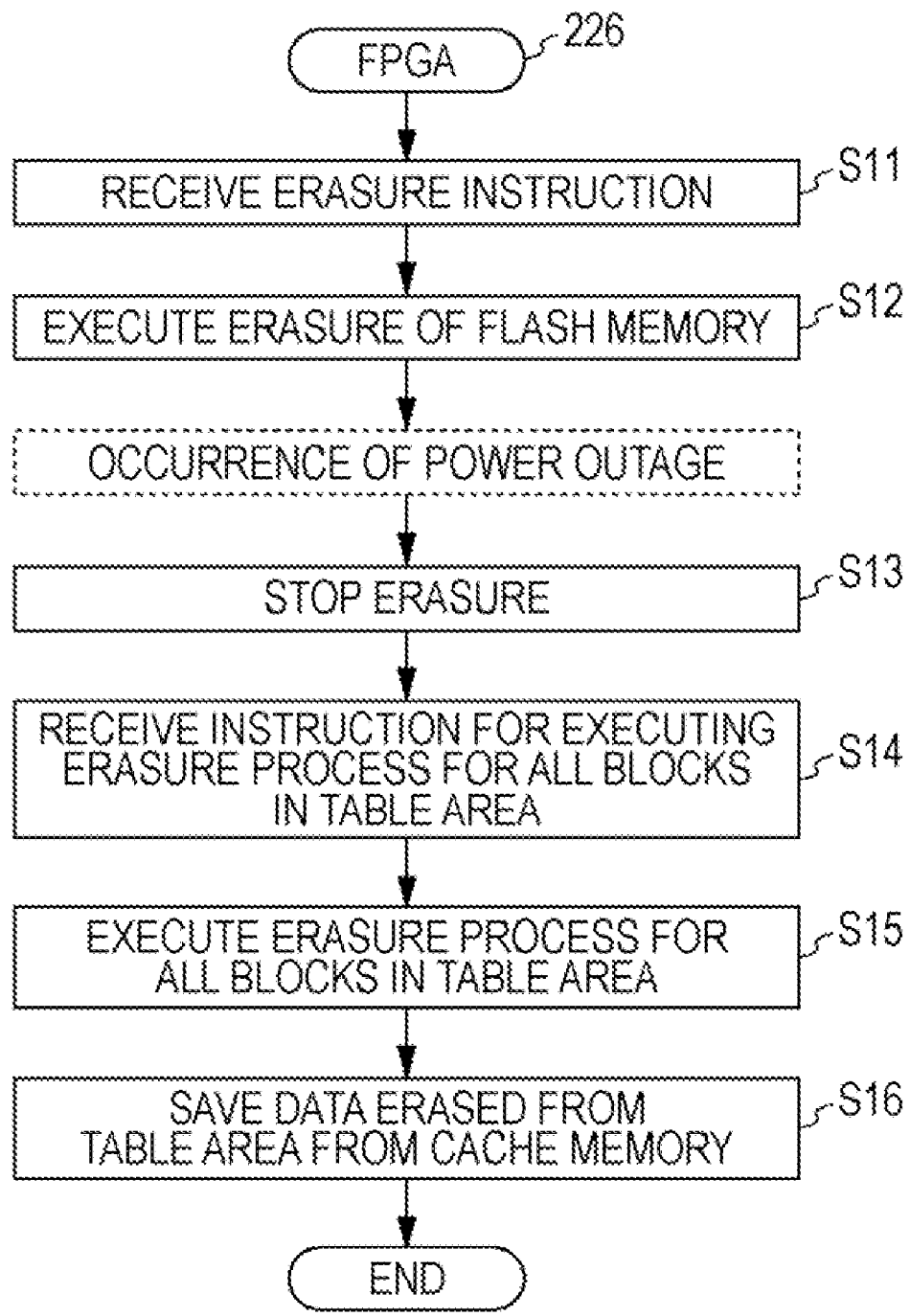

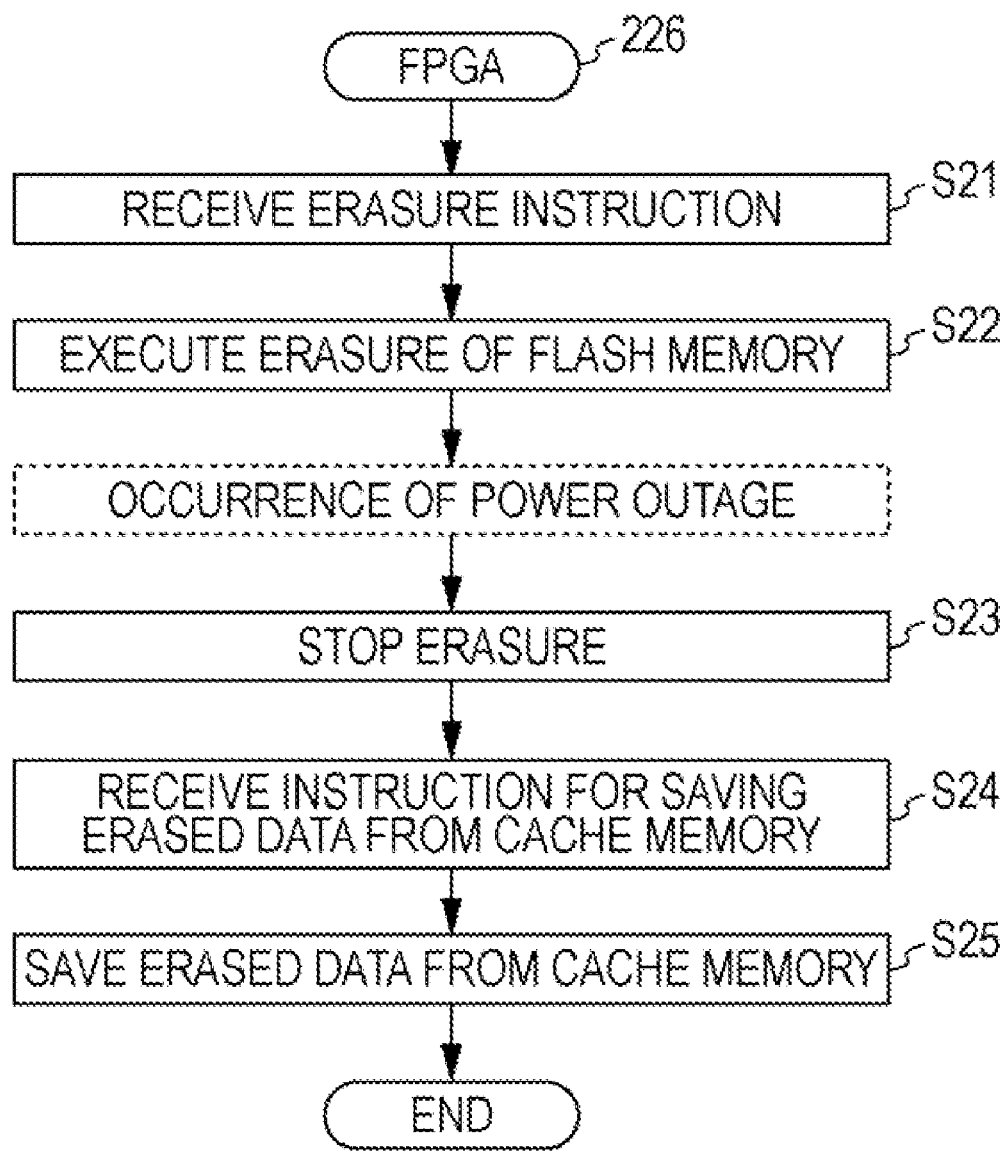

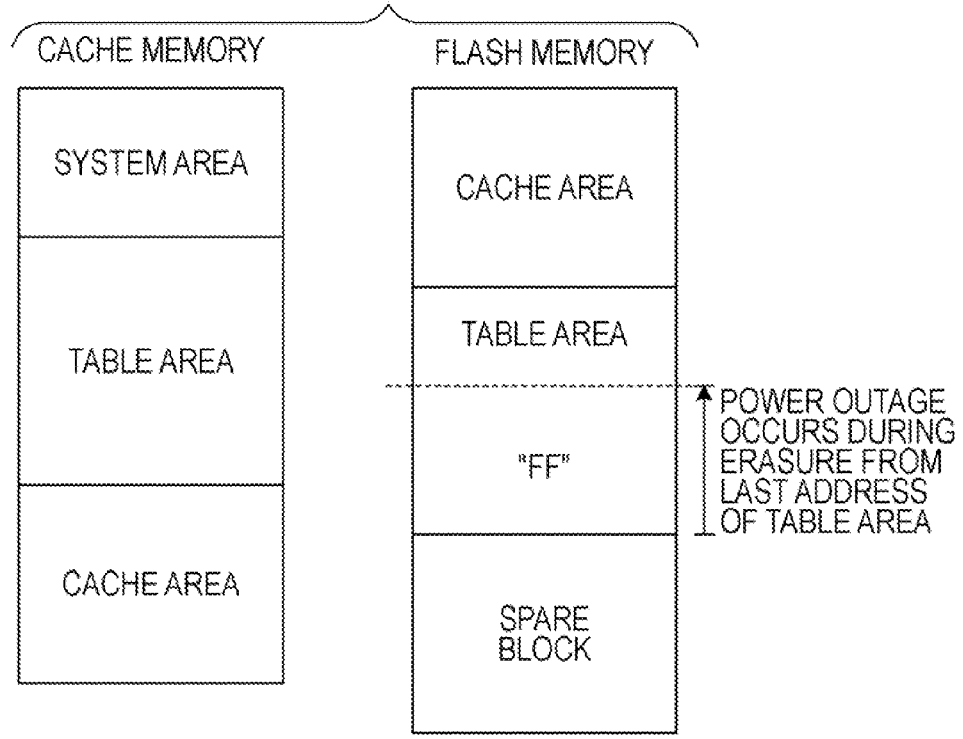
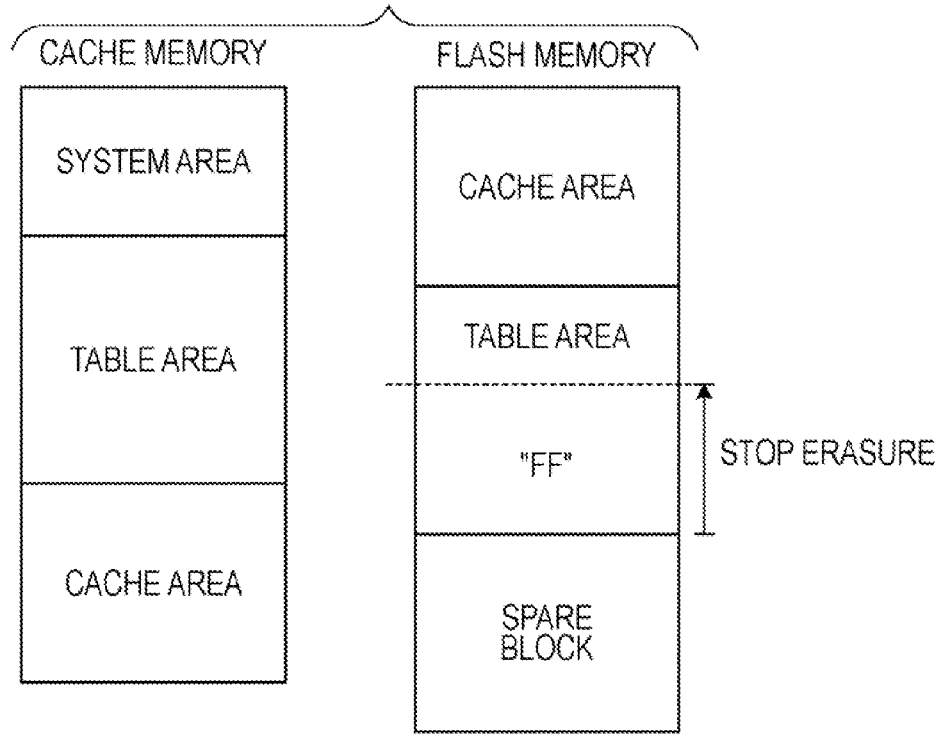

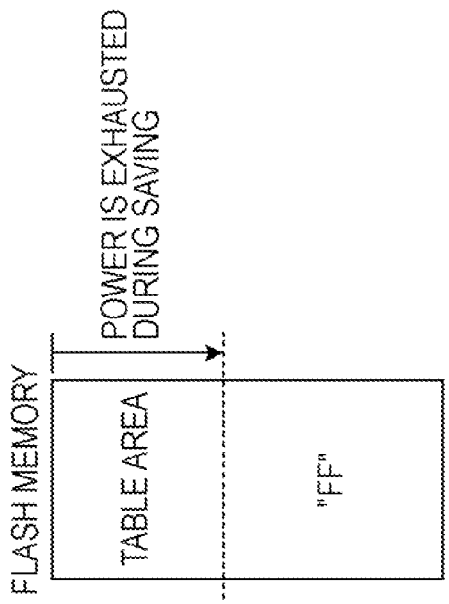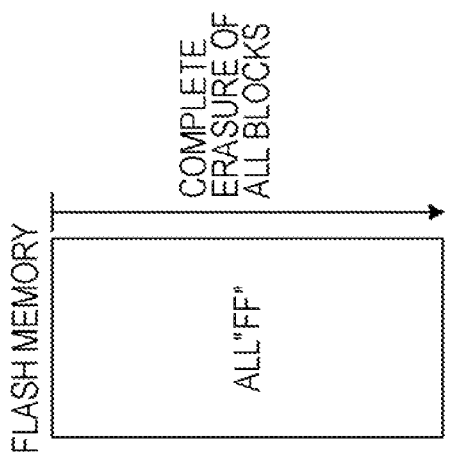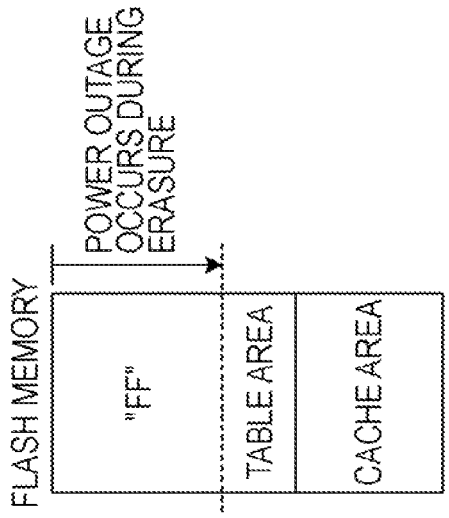

DATA STORAGE DEVICE AND METHOD

CROSS-REFERENCE TO RELATED APPLICATION

This application is based upon and claims the benefit of priority of the prior Japanese Patent Application No. 2009-121327, filed on May 19, 2009 the entire contents of which are incorporated herein by reference.

FIELD

The embodiments discussed herein are related to a data storage device.

BACKGROUND

Various techniques for avoiding loss of data written on, for example, a volatile memory in storage devices when power failures such as outages cause shutdown of the power supply have been proposed. For example, a technique for obtaining power for saving data from a volatile memory by using the capacitor discharge effect even during power supply shutdown caused by a power outage has been proposed.

The technique for avoiding loss of data involves, for example, a power outage process and a power recovery process which are executed in a computer system including a plurality of storage devices, such as a Redundant Arrays of Inexpensive Disks (RAID) device in order to avoid data loss caused by the occurrence of a power outage.

The power outage process is a process for saving or backing up data on a cache memory into a flash memory or the like (nonvolatile memory) when a power outage occurs. The power recovery process is a process involved in recovery from a power outage for restoring backup data on a flash memory to a cache memory to recover the state of the system to that before the occurrence of the power outage.

The power outage process and the power recovery process will now be briefly described with reference to the drawings. FIGS. 16 to 21 and FIGS. 22A to 22C are diagrams illustrating the related art. As illustrated in FIG. 16, a computer system of the related art includes a control enclosure (CE) having a control module (CM) for controlling the internal operation of the system, and a disk enclosure (DE) having a plurality of disks.

First, the power outage process will be described. Upon detection of the occurrence of a power outage, the CM is supplied with power from a super capacitor unit (SCU), and performs the power outage process by saving cache data on a cache memory into a flash memory and shutting down the power supply.

As illustrated in FIG. 17, the cache memory is divided into a system area, a table area, and a cache area. The table area contains device control information in the saved data, and the cache area contains user data in the saved data. When the device is booted up, the flash memory is initialized for the occurrence of a power outage, and contains no data. As illustrated in FIGS. 18 and 19, when the power outage process described above is executed, the data written on the table area and the cache area of the cache memory is saved into the flash memory. Since the system area is an area in which programs are written, no saving is required.

Next, the power recovery process will be described. When power is turned on because of recovery from the power outage, as illustrated in FIGS. 20 and 21, the CM copies or restores the cache data saved into the flash memory to the cache memory. After the cache data has been completely copied, as illustrated in FIGS. 22A to 22C, the CM performs an erasure process to erase all the blocks in the flash memory from the beginning. Accordingly, the power recovery process is executed. Japanese Laid-open Patent Publication No. 6-231053 is an example of the related art.

The technique for avoiding data loss using the power outage process and power recovery process described above has the following problem: When a power outage occurs once again during the erasure of the table area or cache area of the flash memory in the power recovery process, first, the erasure of all the blocks in the flash memory needs to be completed (see FIGS. 23A and 23B). Then, after the completion of the erasure of the flash memory, subsequently, the data on the cache memory is saved into the flash memory.

However, sufficient power to completely save the data from the cache memory to the flash memory may not necessarily be accumulated in the SCU after the completion of the erasure of the flash memory (see FIG. 23C). This may prevent the cache data from being completely saved into the flash memory and may cause loss of the latest data (table area) on the cache memory.

Furthermore, as illustrated in FIG. 24A, a technique for avoiding loss of latest data by assembling sequences so that the erasure of flash memories is shifted in timing between redundantly configured CMs has also been proposed. Even if a power outage occurs during the erasure of a flash memory controlled by one of the CMs, a flash memory controlled by the other CM is allowed to hold latest data. The loss of the latest data can thus be avoided. However, this technique is not applicable to a configuration including a single CM as illustrated in FIG. 24B. Such problems of the related art are illustrated in FIGS. 23A to 23C and FIGS. 24A and 24B.

SUMMARY

A data storage apparatus includes a cache memory for storing data including user data and control information of the apparatus, a nonvolatile memory, a power supply for supplying an instant power after an occurrence of a power failure, and a processor for executing a process including when the power failure occurs, saving the user data and the control information stored in the cache memory into the nonvolatile memory by using the instant power, when the power failure recovers, restoring the data stored in the nonvolatile memory into the cache memory, updating the managing information stored in the cache memory, and erasing the data stored in the nonvolatile memory after restoring the data into the cache memory and when another power failure occurs during erasing the data stored in the nonvolatile memory, stopping the erasing, erasing the control information stored in the nonvolatile memory by using the supplied power if the control information is remained in the nonvolatile memory and saving, into the nonvolatile memory, the updated control information stored in the cache memory and the user data which has been erased from the nonvolatile memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating information managed by a control information management table according to the first embodiment.

FIG. 3 is a diagram illustrating a process flow of the storage device according to the first embodiment.

FIG. 4 is a diagram illustrating a process flow of the storage device according to the first embodiment.

FIG. 5 is a diagram illustrating a process flow of the storage device according to the first embodiment.

FIG. 6 is a diagram describing a process performed by the storage device according to the first embodiment.

FIG. 7 is a diagram describing a process performed by the storage device according to the first embodiment.

FIGS. 23A to 23C are diagrams describing problems of the related art.

DESCRIPTION OF EMBODIMENTS

A storage device, a data storage method, and a data storage program according to embodiments disclosed herein will be described in detail hereinafter with reference to the drawings. A technique disclosed herein is not limited to the following examples of the storage device, the data storage method, and the data storage program according to the embodiments. The technique may avoid loss of cache data when a power outage occurs during the power recovery process.

First Embodiment

A storage device according to a first embodiment performs a power outage process for saving cache data on a cache memory into a flash memory. The storage device further performs a power recovery process involved in recovery from a power outage, including copying or restoring the cache data saved into the flash memory to the cache memory and erasing all the blocks in the flash memory. Using the above power outage process and the above power recovery process can avoid loss of data written on a volatile memory.

The storage device according to the first embodiment has the following features: When a power outage occurs during the erasure of a flash memory in the power recovery process, the erasure is stopped. In a case where up to the middle of a table area in the flash memory has been erased at the time when the erasure is stopped, all the blocks in the table area are erased. After the completion of the erasure of all the blocks in the table area, the data erased from the table area is resaved from the cache memory to the flash memory.

In a case where up to the cache area in the flash memory has been erased at the time when the erasure is stopped, the data erased from the flash memory is immediately resaved from the cache memory to the flash memory. A specific example of the storage device according to the first embodiment will now be described.

Configuration of Storage Device

First Embodiment

Figure 1:
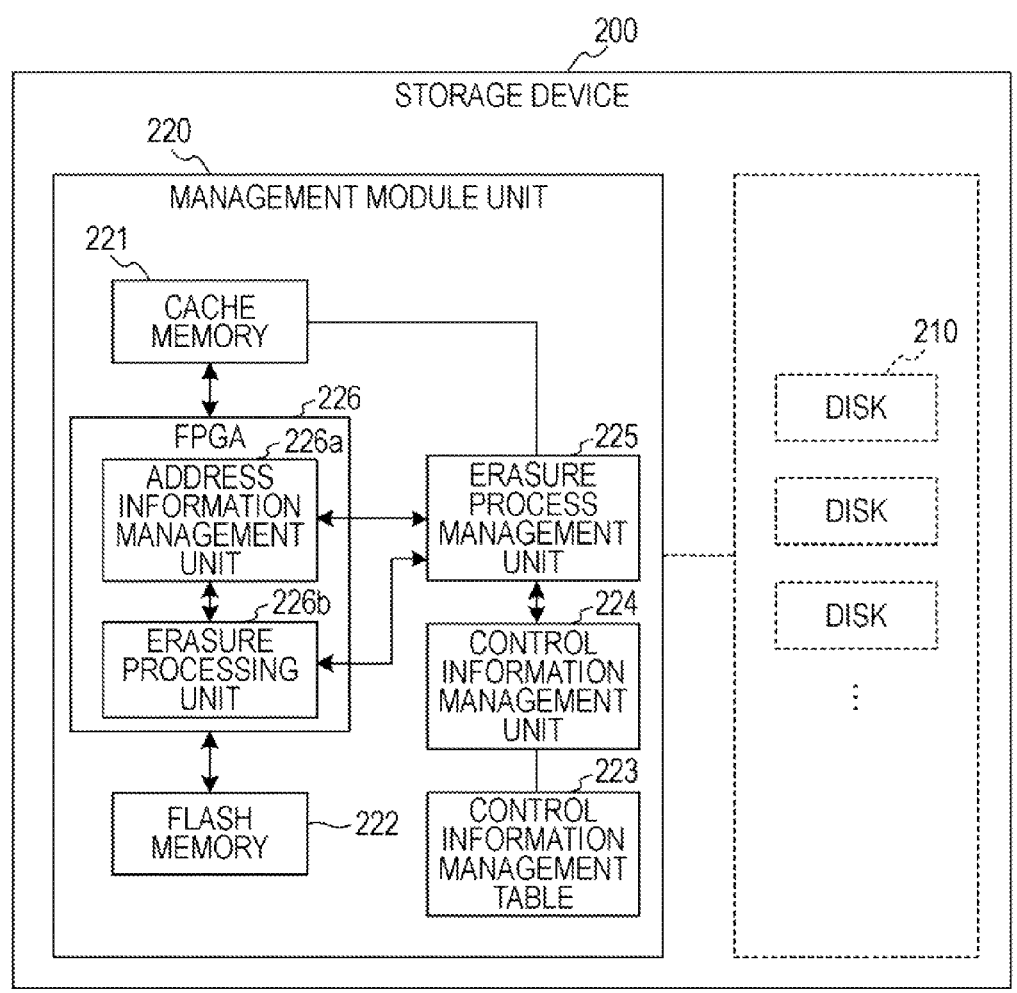
FIG. 1 is a diagram illustrating the configuration of a storage device according to a first embodiment.

FIG. 1 is a diagram illustrating the configuration of a storage device 200 according to the first embodiment. As illustrated in FIG. 1, the storage device 200 according to the first embodiment includes a plurality of disks 210 and a management module unit 220.

As illustrated in FIG. 1, the management module unit 220 includes a cache memory 221, a flash memory 222, a control information management table 223, a control information management unit 224, an erasure processing management unit 225, and a field programmable gate array (FPGA) 226.

The cache memory 221 stores data that is frequently used in the processing of the management module unit 220, and is capable of high-speed data readout. The flash memory 222 holds cache data saved from the cache memory 221.

The control information management table 223 manages information necessary to perform the erasure process of the flash memory 222. For example, the control information management table 223 manages the size of the table area (see section (1) in FIG. 2) and the size of the cache area (see section (2) in FIG. 2) of the flash memory 222, and the address of the first block in the table area (see section (3) in FIG. 2). FIG. 2 is a diagram illustrating information managed by the control information management table 223 according to the first embodiment.

The control information management unit 224 manages the progress of the erasure process of the flash memory 222, that is, up to the block in the flash memory 222 for which erasure has been completed.

The erasure processing management unit 225 sends an instruction to the FPGA 226 to perform erasure of the flash memory 222. Further, the erasure processing management unit 225 controls the execution and stoppage of the erasure process of the flash memory 222 on the basis of the information managed in the control information management table 223. The details of the specific process performed by the erasure processing management unit 225 will be described in the description of the process of the storage device 200 given below.

In the power outage process, the FPGA 226 saves cache data into the flash memory 222. In the power recovery process, the FPGA 226 copies or restores the data saved into the flash memory 222 to the cache memory 221, and erases all the blocks in the flash memory 222.

The FPGA 226 is supplied by the SCU (power supply). The SCU may an instant power after an occurrence of a power outage (power failure).

As illustrated in FIG. 1, the FPGA 226 includes an address information management unit 226a and an erasure processing unit 226b. The address information management unit 226a manages addresses in the erasure process of the flash memory 222.

The erasure processing unit 226b executes erasure of the flash memory 222. The details of the specific process performed by the erasure processing unit 226b will be described in the description of the process of the storage device 200 given below.

Process of Storage Device

First Embodiment

A process flow of the management module unit 220 (in particular, the erasure processing management unit 225 and the FPGA 226) of the storage device 200 will now be described.

FIGS. 3 to 5 are diagrams illustrating a process flow of the storage device 200 according to the first embodiment. FIGS. 6 to 13 are diagrams describing the process of the storage device 200 according to the first embodiment.

[Process of Erasure Processing Management Unit]

First, a process flow of the erasure processing management unit 225 will be described with reference to FIG. 3. As illustrated in FIG. 3, at the completion of the copying or restoration of cache data to the cache memory 221, the erasure processing management unit 225 sends an instruction to the erasure processing unit 226b to execute an erasure process (step S1).

As illustrated in FIGS. 6 and 7, when the erasure process performed in the FPGA 226 is interrupted by the occurrence of a power outage, the erasure processing management unit 225 obtains the address of the flash memory 222 on which the erasure process is executed at the time of interruption from the FPGA 226 (step S2).

Further, the erasure processing management unit 225 obtains management information (for example, the address of the first block in the table area and the size of the table area) from the control information management table 223, and compares the obtained information with the address obtained from the FPGA 226. Then, the erasure processing management unit 225 determines whether or not the erasure process has been completed for all the blocks in the table area at the time of interruption caused by the occurrence of the power outage (step S3).

When it is determined that the erasure has not been completed for all the blocks in the table area of the flash memory 222 (NO in step S3), the erasure processing management unit 225 sends an instruction to the FPGA 226 to execute the erasure process to erase all the blocks in the table area (step S4). After the completion of the erasure of all the blocks in the table area of the flash memory 222, the erasure processing management unit 225 sends a resave instruction to the FPGA 226 to immediately save from the cache memory 221 data corresponding to the data erased from the flash memory 222 (step S5).

Figure 11:
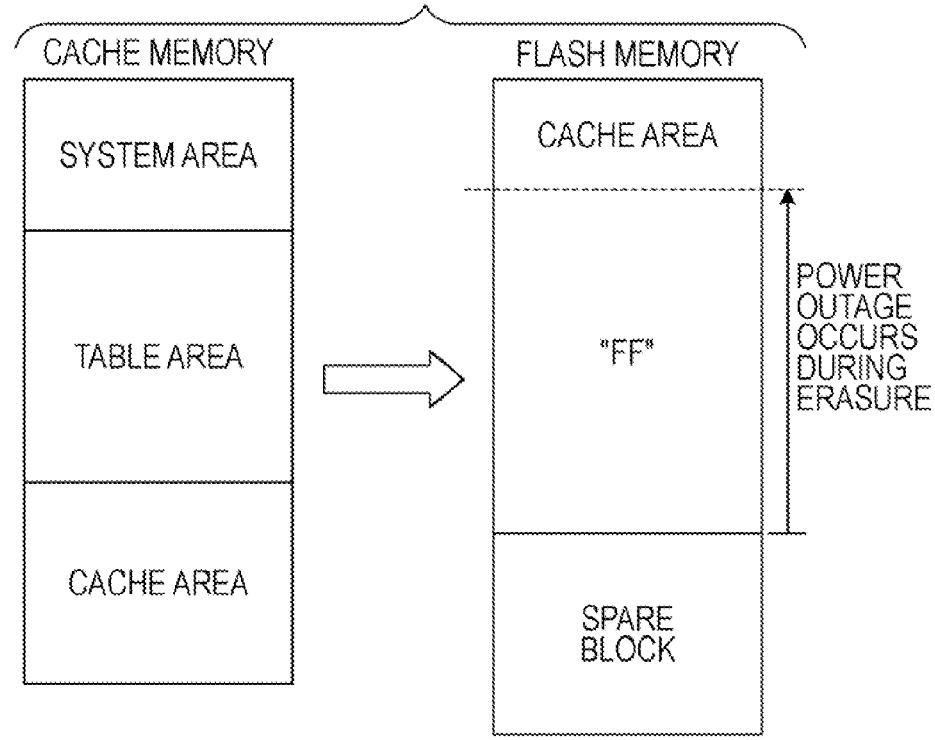
FIG. 11 is a diagram describing a process performed by the storage device according to the first embodiment.
Figure 12:
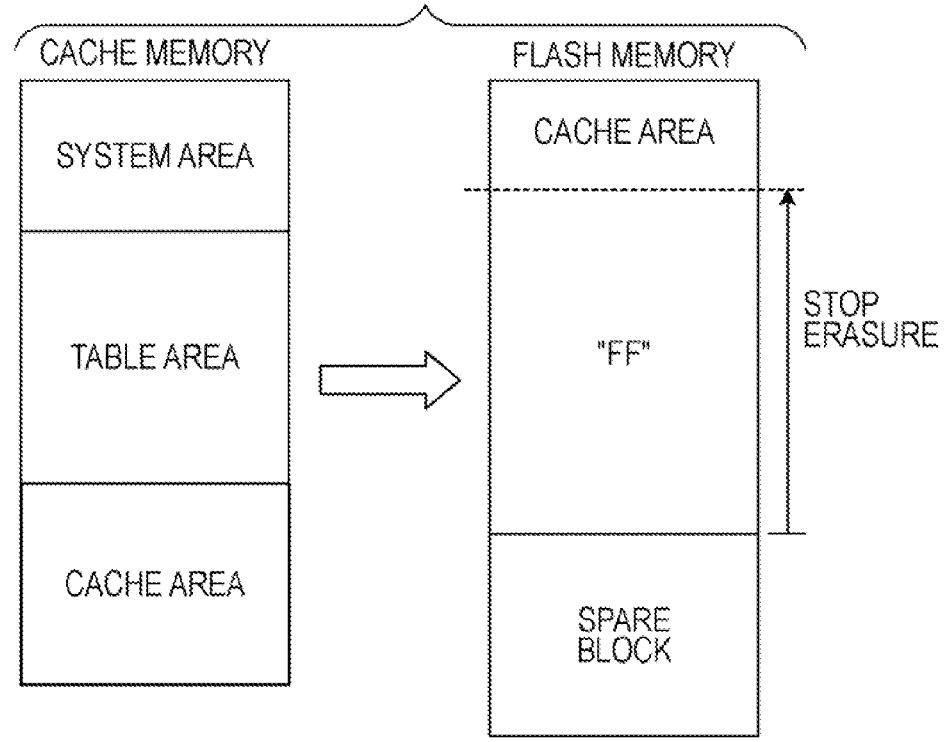
FIG. 12 is a diagram describing a process performed by the storage device according to the first embodiment.

Conversely, when the erasure has been completed for all the blocks in the table area of the flash memory 222 (YES in step S3), as illustrated in FIGS. 11 and 12, since the erasure of the cache area is in progress at the time when the erasure process is interrupted by the occurrence of the power outage, as in the processing of step S5 described above, the erasure processing management unit 225 sends a resave instruction to the FPGA 226 to immediately save from the cache memory 221 data corresponding to the data erased from the flash memory 222 (step S5).

Figure 10A:
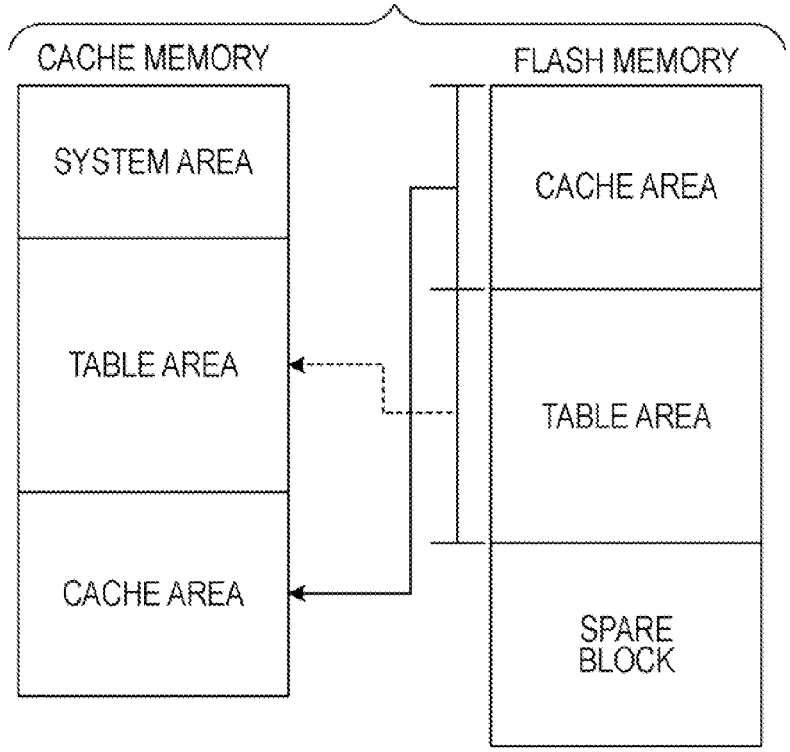
FIGS. 10A and 10B are diagrams describing a process performed by the storage device according to the first embodiment.
Figure 10B:
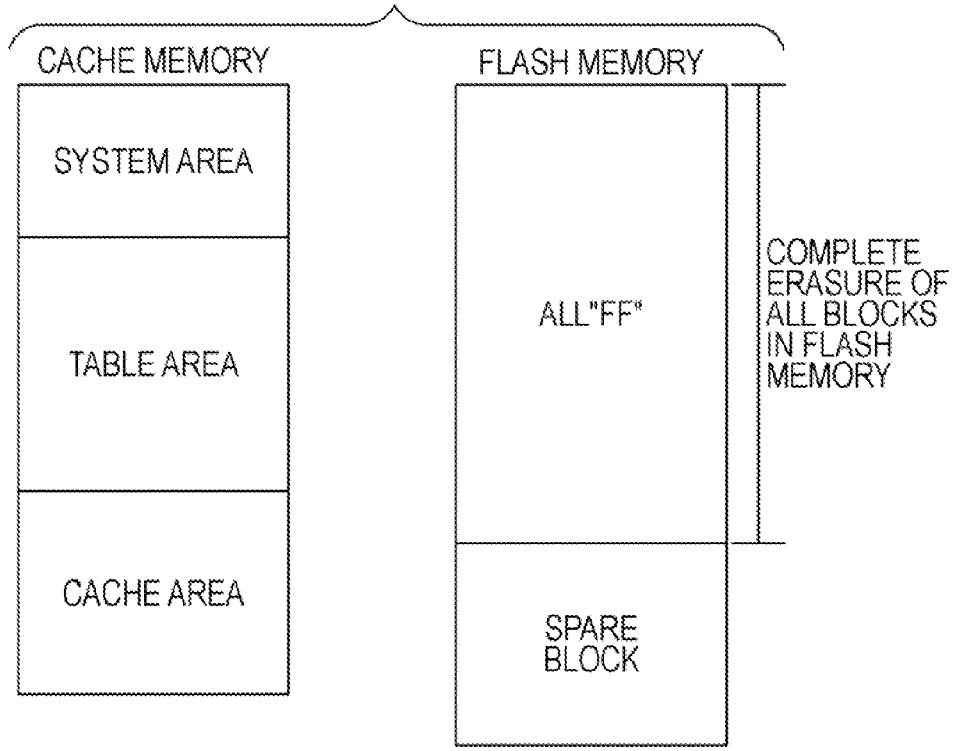

In the case of recovery from the power outage after the completion of the resaving of the cache data by the FPGA 226, the management module unit 220 executes a normal power recovery process. Specifically, as illustrated in FIGS. 10A and 10B, the management module unit 220 copies or restores the cache data saved into the flash memory 222 to the cache memory 221, and erases all the blocks in the flash memory 222.

[Process of FPGA]

Next, a process flow of the FPGA 226 (in particular, the erasure processing unit 226b) will be described with reference mainly to FIGS. 4 and 5. First, the flow of a process for erasing data on all the blocks in the table area of the flash memory 222 will be described with reference to FIG. 4. Upon receipt of an instruction from the erasure processing management unit 225 to execute an erasure process (step S11), the FPGA 226 executes an erasure process of the flash memory 222 (step S12).

Figure 8:
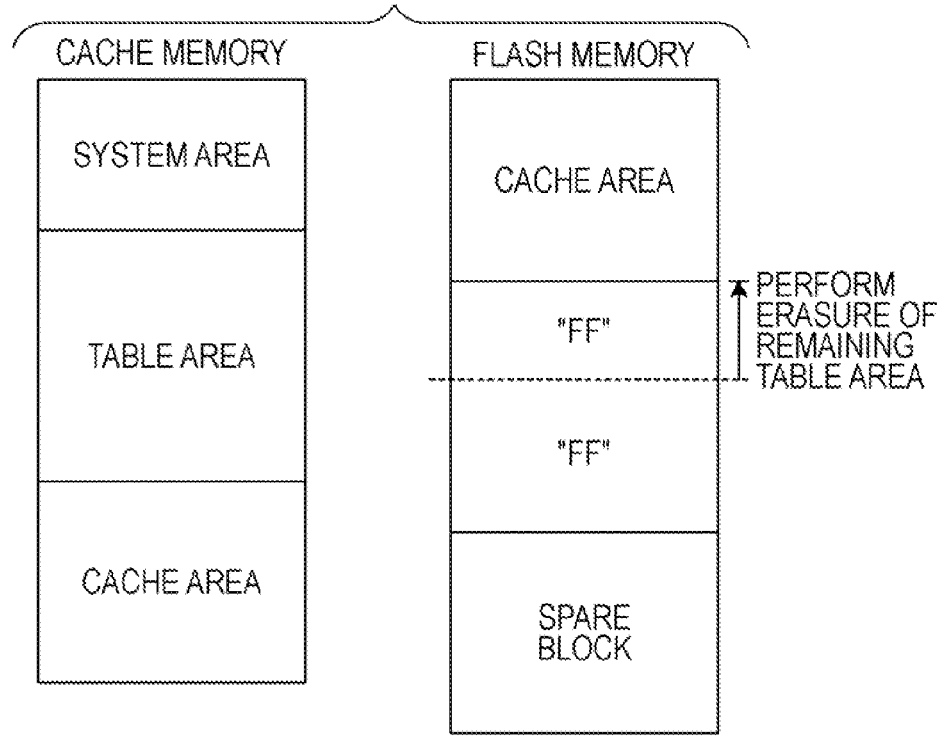
FIG. 8 is a diagram describing a process performed by the storage device according to the first embodiment.
Figure 9:
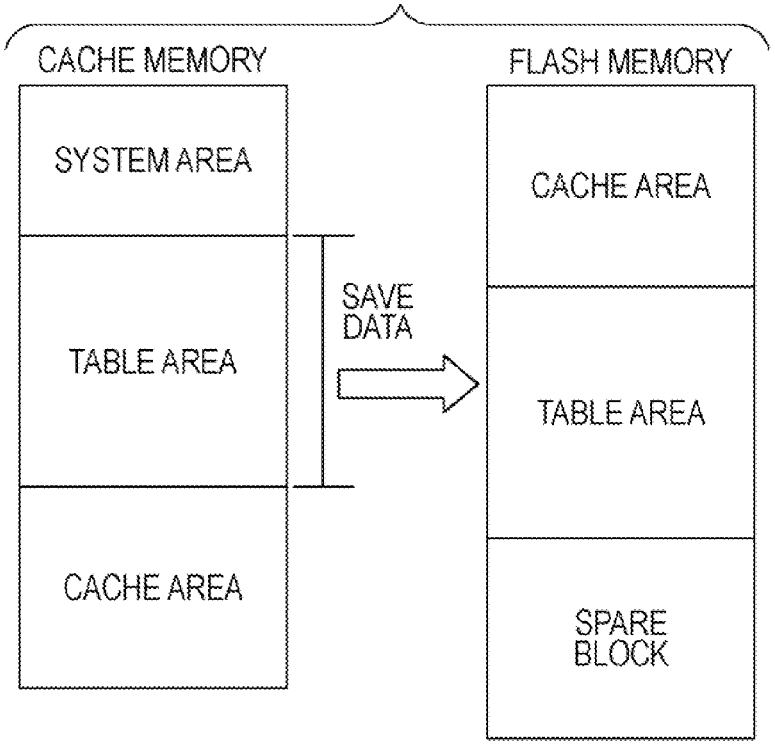
FIG. 9 is a diagram describing a process performed by the storage device according to the first embodiment.

When a power outage occurs, the FPGA 226 stops the erasure process of the flash memory 222 which is in progress (step S13). Then, upon receipt of an instruction from the erasure processing management unit 225 to execute the erasure process of all the blocks in the table area of the flash memory 222 (step S14), as illustrated in FIG. 8, the FPGA 226 executes the erasure process of all the blocks in the table area of the flash memory 222 (step S15). When the erasure is completed for all the blocks in the table area, as illustrated in FIG. 9, the FPGA 226 resaves data corresponding to the data on all the blocks in the table area, which has been erased from the flash memory 222, from the cache memory 221 (step S16). Then, the process ends.

Subsequently, the flow of a process performed when up to the cache area has been erased at the time of interruption will be described with reference to FIG. 5. The processing of steps S21 to S23 illustrated in FIG. 5 is similar to the processing of steps S11 to S13 described above with reference to FIG. 4, and will not be described herein.

Figure 13:
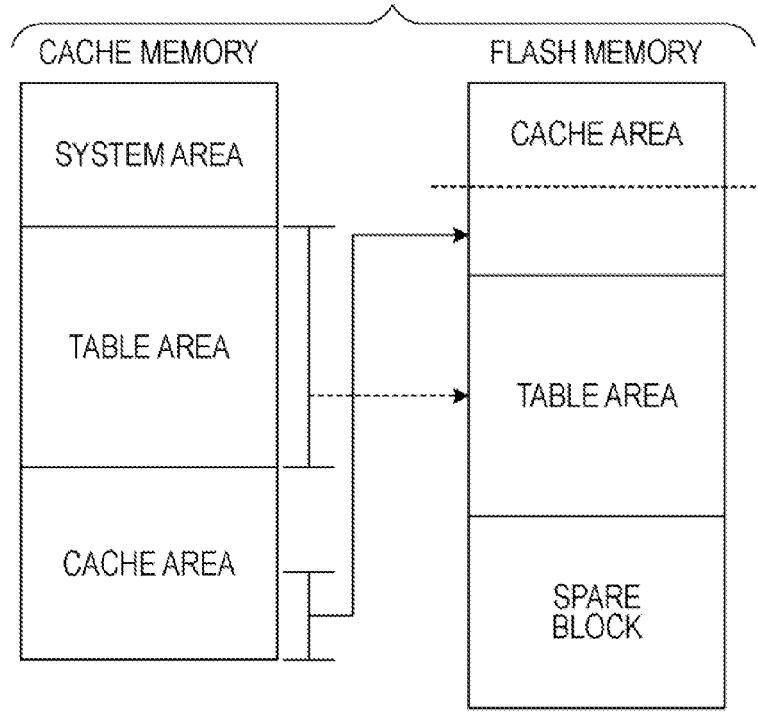
FIG. 13 is a diagram describing a process performed by the storage device according to the first embodiment.

The FPGA 226 receives an instruction from the erasure processing management unit 225 to resave the data erased from the flash memory 222 from the cache memory 221 (step S24). Then, as illustrated in FIG. 13, in accordance with the instruction from the erasure processing management unit 225, the FPGA 226 resaves the data erased from the flash memory 222 from the cache memory 221 (step S25). Then, the process ends.

Subsequently, in the case of recovery from the power outage, the power recovery process described above (FIGS. 10A and 10B) is executed.

Advantages of First Embodiment

As described above, according to the first embodiment, when a power outage occurs during the erasure of a flash memory in the power recovery process, the erasure is stopped. In a case where up to the middle of the table area in the flash memory has been erased at the time when the erasure is stopped, all the blocks in the table area are erased. After the completion of the erasure of all the blocks in the table area, the data erased from the table area is resaved from the cache memory to the flash memory.

Specifically, the address of the first block in the table area of the flash memory 222 and the size of the table area are managed in the control information management table 223. Then, when up to the middle of the table area has been erased, all the blocks in the table area are deleted and then only the data on the table area is quickly resaved using the information about the address of the first block in the table area and the size of the table area as long as the power is supplied from the SCU.

All the blocks in the table area of the flash memory 222 are erased before the resaving of data because the cache memory 221 is returned to the latest state before the occurrence of the power outage using the power recovery process.

The control information about the storage device 200, which is contained in the table area of the flash memory 222, may be updated during the power recovery process. Thus, when a power outage occurs during the power recovery process and data on the table area of the flash memory 222, which has been erased, is resaved from the cache memory 221 to the flash memory 222, all the control information updated in the cache memory 221 during the power recovery process may not necessarily be saved into the flash memory 222. Therefore, in a case where up to the middle of the table area in the flash memory 222 has been erased at the time when a power outage occurs during erasure in the power recovery process, all the blocks in the table area are temporarily erased and then cache data to be written to the table area is resaved.

In a case where up to the cache area in the flash memory 222 has been erased at the time when the erasure is stopped, the data erased from the flash memory 222 is immediately resaved from the cache memory 221 to the flash memory 222.

Specifically, the size of the cache area, which has been erased, is specified from the address of the first block in the table area, the size of the table area, and the address of the flash memory 222 at the time of interruption of the erasure. Then, the data erased from the flash memory 222 (the data on the table area and the data on the cache area) is immediately resaved from the cache memory 221 to the flash memory 222 as long as the power is supplied from the SCU.

Therefore, even in a configuration including a single CM, when a power outage occurs during the power recovery process, cache data can be recovered to the latest state and loss of cache data can be accurately avoided.

Second Embodiment

A storage device, a data storage method, and a data storage program according to other embodiments will be described hereinafter.

(1) Spare Block

Figure 14:
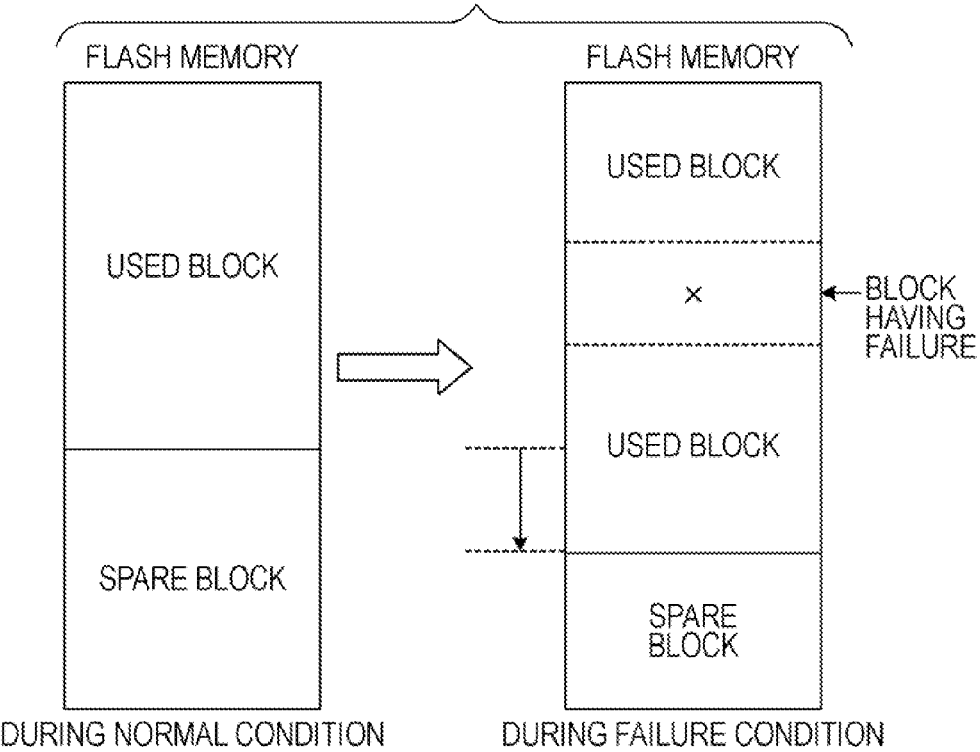
FIG. 14 is a diagram describing spare blocks according to a second embodiment.

As illustrated in FIG. 14, a spare block may be provided in the flash memory 222, and may be used instead of a block that has experienced a failure in the flash memory 222. When data is saved from the cache memory 221, a number of spare blocks corresponding to the size of a block that has experienced a failure may be used. The use of the spare blocks allows more reliable saving of cache data. Information about the block that has experienced a failure is stored in an information storage block provided in the flash memory 222 which is not illustrated in FIG. 14. FIG. 14 is a diagram describing a spare block according to a second embodiment.

(2) Device Configuration and Other

The elements of the storage device 200 illustrated in FIG. 1 are examples of conceptual functionality thereof, and may not necessarily have a physical configuration illustrated in FIG. 1. That is, the specific distribution and integration mechanism of the storage device 200 is not limited to that illustrated in FIG. 1. For example, the control information management table 223, the control information management unit 224, and the erasure processing management unit 225 may be functionally or physically integrated.

In this manner, an entirety or portions of the storage device 200 can be configured by functional or physical distribution or integration in any units in accordance with various load conditions, the conditions of use, or the like. Furthermore, the process functions (see FIGS. 3 to 5) achieved in the storage device 200 can be implemented by, for example, a central processing unit (CPU) and a program analyzed and executed by the CPU, or can be implemented as wired logic hardware.

(3) Data Storage Method

The following data storage method may be implemented by the storage device 200 described above in the first embodiment.

Specifically, the data storage method may include a power outage process step of saving data stored on a first storage unit into a second storage unit when a power outage occurs, a power recovery process step of restoring the data saved into the second storage unit to the first storage unit in the case of recovery from the power outage and executing an erasure process to erase data stored in the second storage unit, an erasure process stopping step (see, for example, step S3 in FIG. 4) of stopping the erasure process executed in the power recovery process step when a power outage occurs during the erasure process, a table area erasing step (see, for example, steps S4 and S5 in FIG. 4) of erasing all the blocks in a table area (control information storage area) included in the second storage unit in a case where the erasure process has been performed up to the middle of the table area at the time when the erasure process is stopped in the erasure process stopping step, and a resaving step (see, for example, step S6 in FIG. 4) of resaving data erased from the table area from the first storage unit to the second storage unit after all the blocks in the table area have been completely erased in the table area erasing step.

(4) Data Storage Program

Figure 15:
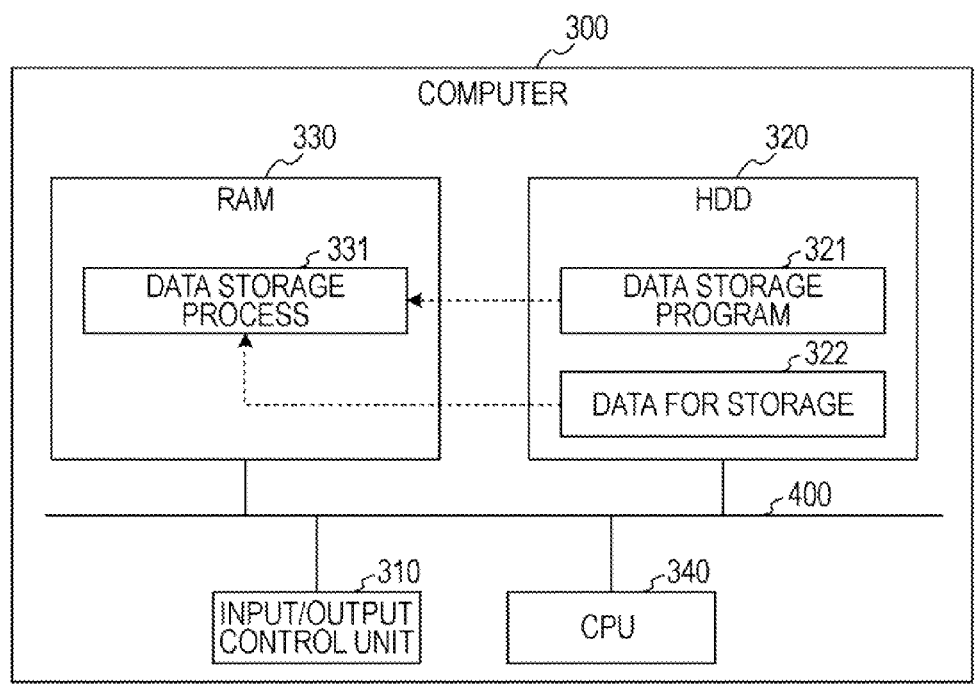
FIG. 15 is a diagram illustrating a computer configured to execute a data storage program.
Figure 16:
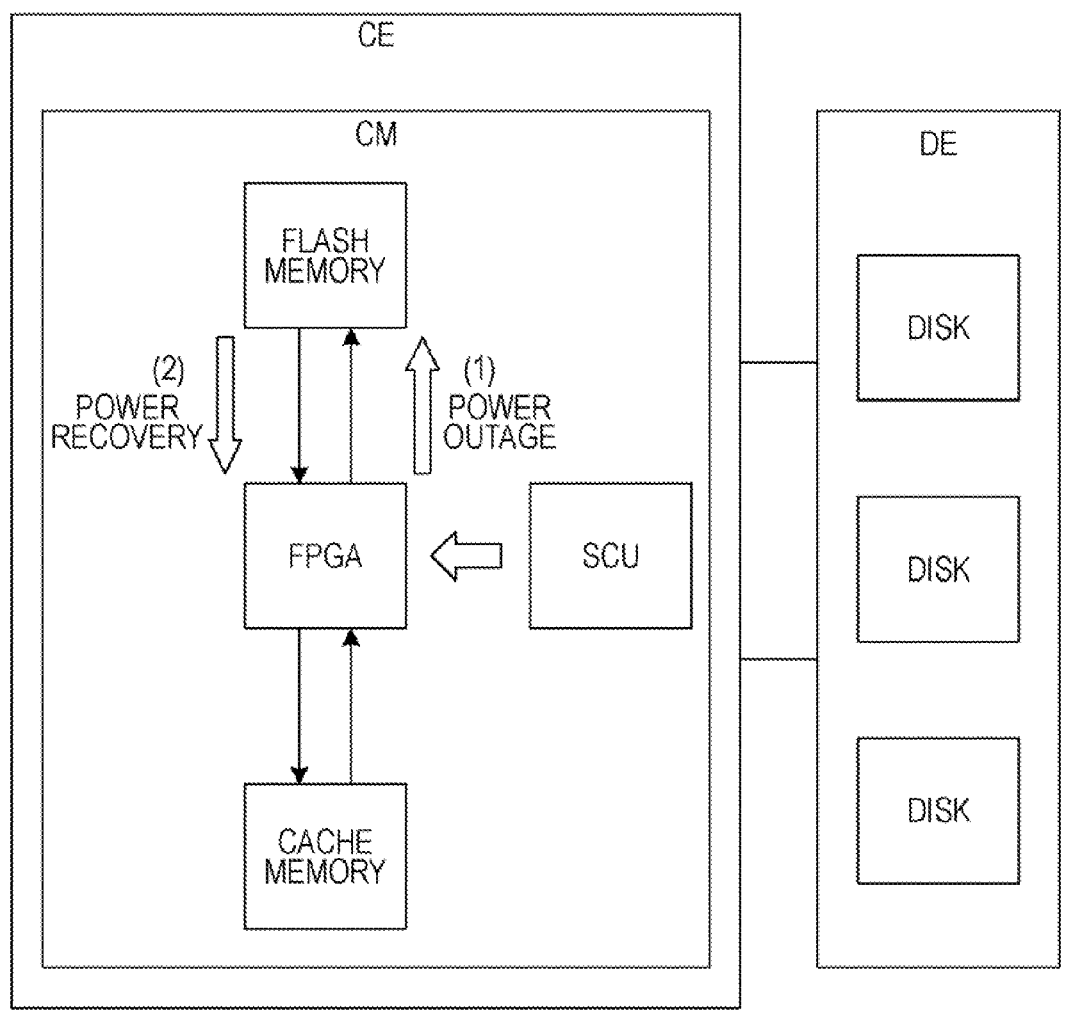
FIG. 16 is a diagram illustrating the related art.
Figure 17:
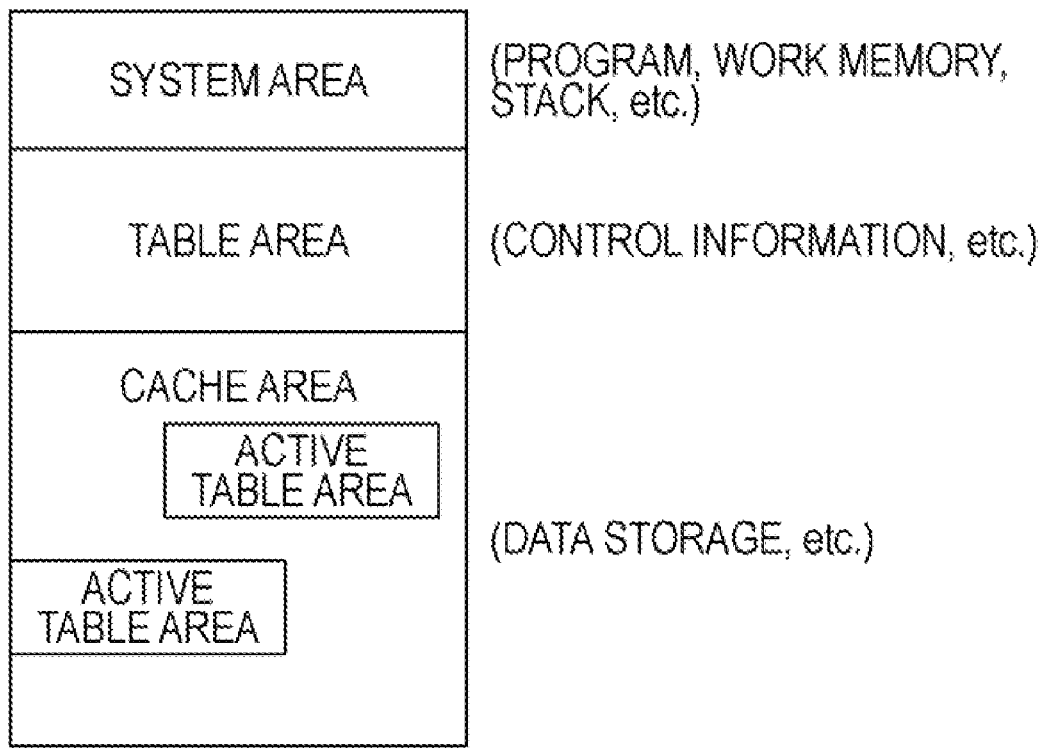
FIG. 17 is a diagram illustrating the related art.
Figure 18:
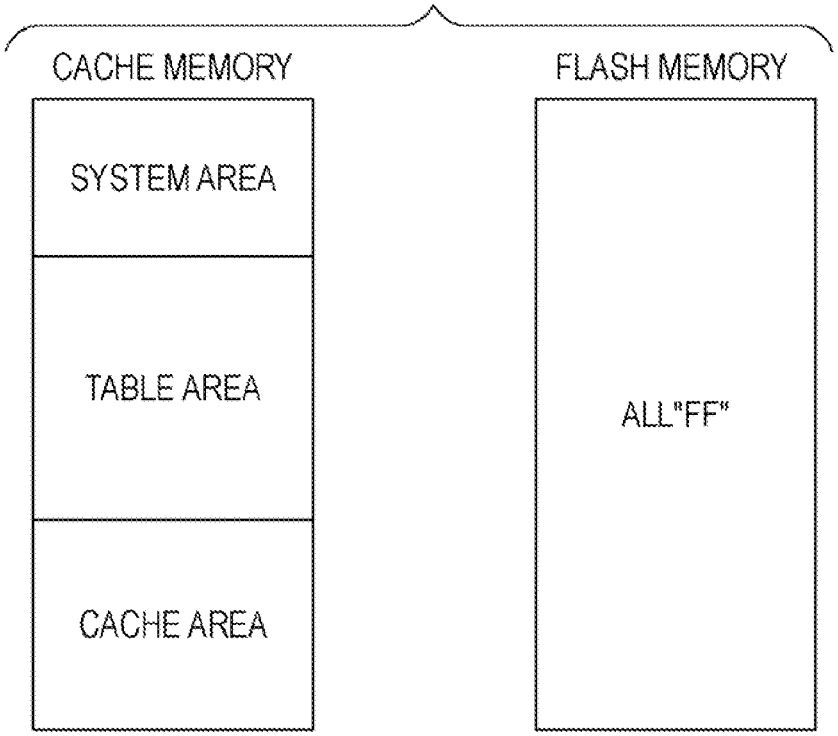
FIG. 18 is a diagram illustrating the related art.
Figure 19:
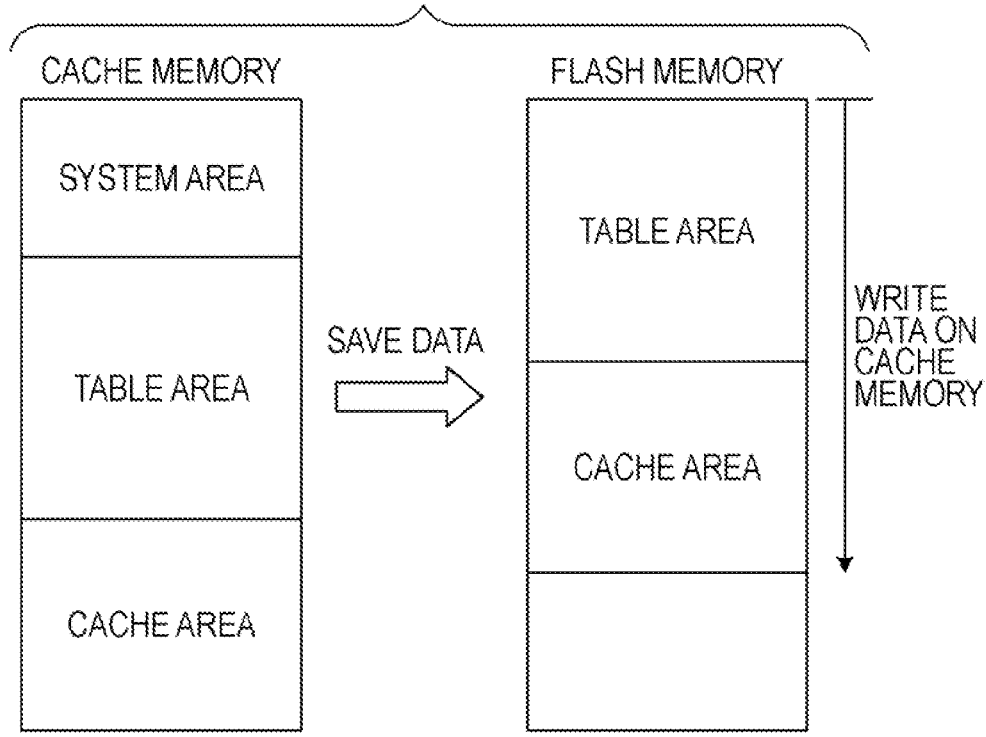
FIG. 19 is a diagram illustrating the related art.
Figure 20:
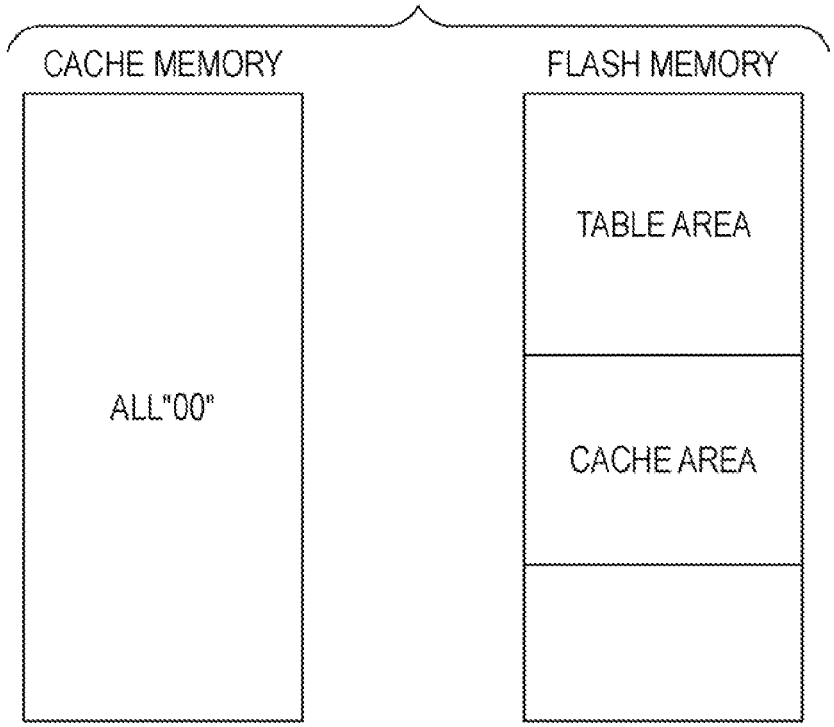
FIG. 20 is a diagram illustrating the related art.
Figure 21:
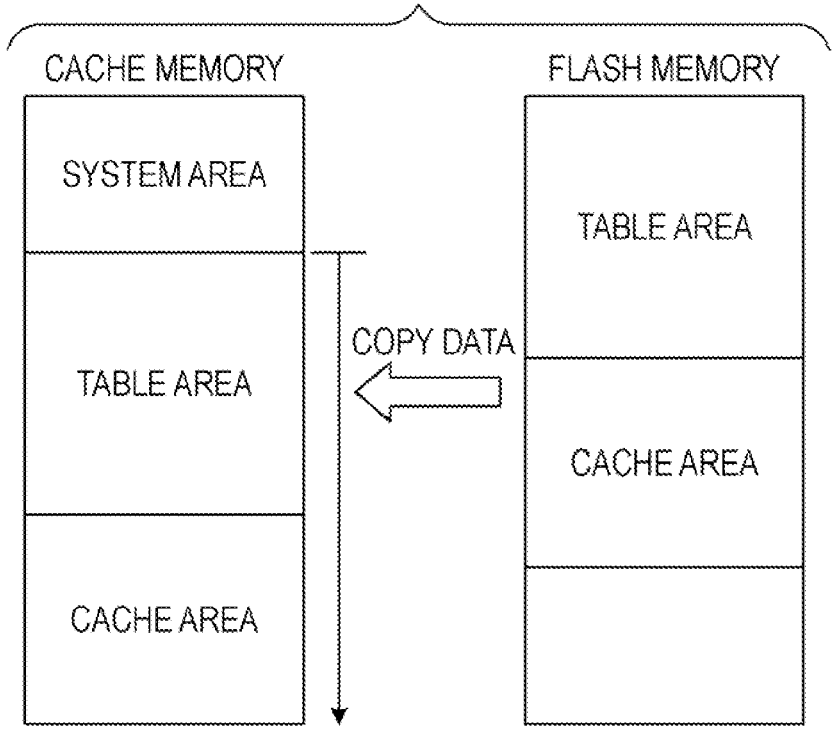
FIG. 21 is a diagram illustrating the related art.
Figure 22A:
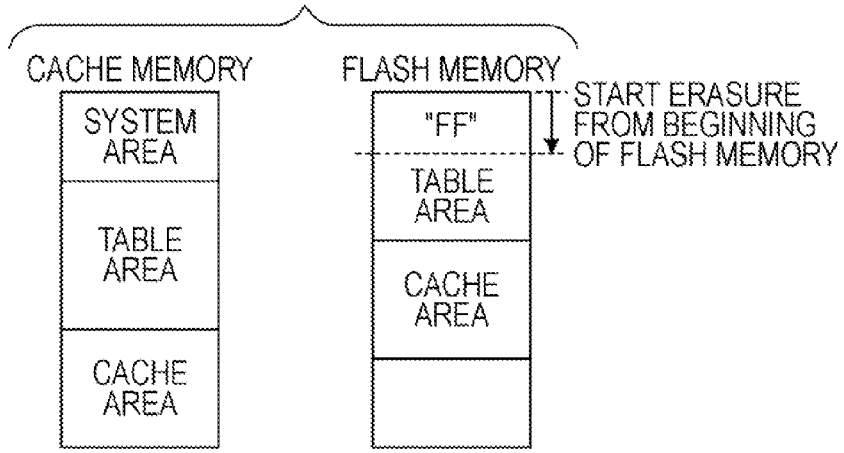
FIGS. 22A to 22C are diagrams illustrating the related art.
Figure 22B:
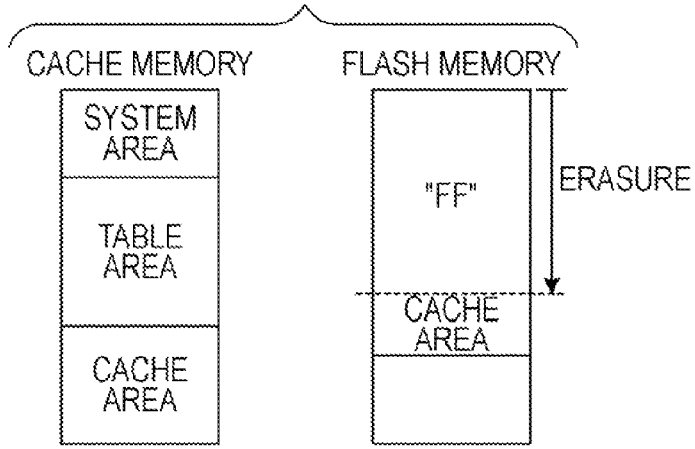
Figure 22C:
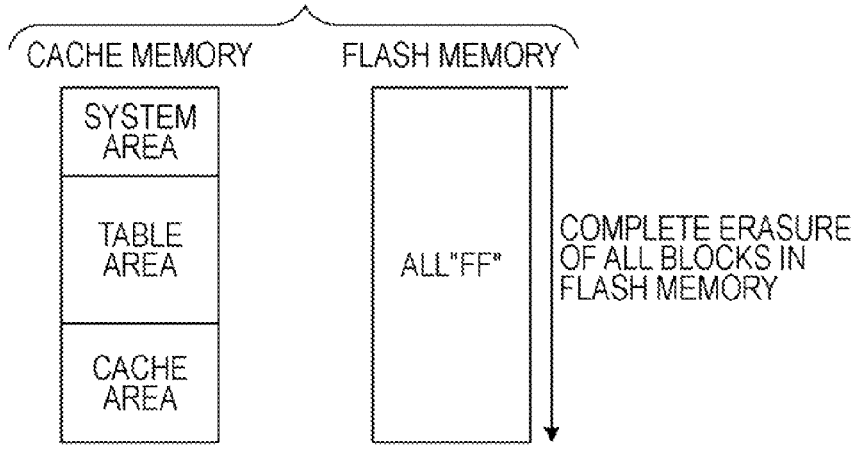
Figure 24A:
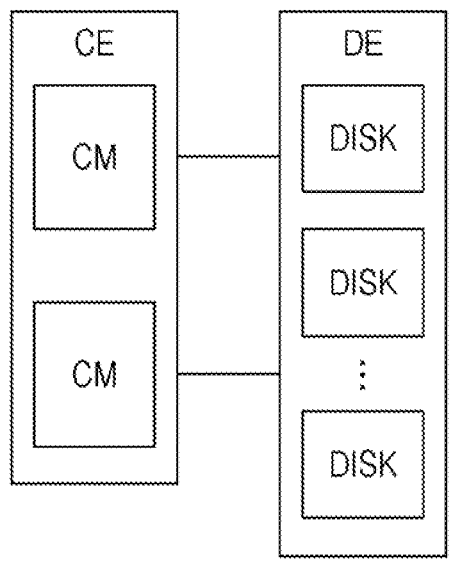
FIGS. 24A and 24B are diagrams describing problems of the related art.
Figure 24B:
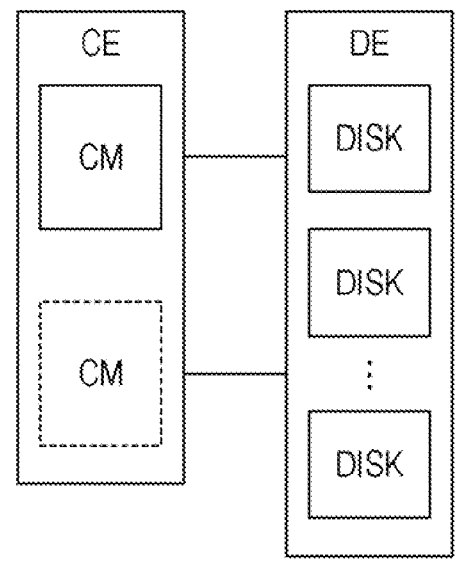

The processes of the storage device 200 described above with respect to the foregoing embodiments (see mainly, for example, FIGS. 3 to 5) can also be implemented by executing a predetermined program on a computer system such a personal computer or a workstation. An example of a computer configured to execute a data storage program having functions similar to those of the storage device 200 described above with respect to the foregoing embodiments will be described hereinafter with reference to FIG. 15. FIG. 15 is a diagram illustrating a computer configured to execute a data storage program.

As illustrated in FIG. 15, a computer 300 serving as the storage device 200 is configured using an input/output control unit 310, a hard disk drive (HDD) 320, a random access memory (RAM) 330, and a CPU 340, which are connected to one another via a bus 400.

The input/output control unit 310 controls input and output of various information. The HDD 320 stores information necessary for the CPU 340 to execute various processes. The RAM 330 temporarily stores various information. The CPU 340 executes various arithmetic processes.

As illustrated in FIG. 15, the HDD 320 stores in advance a data storage program 321 for implementing functions similar to those of the processing units in the storage device 200 illustrated in FIG. 1, and data for storage 322. The data storage program 321 can be distributed as desired and can be stored in a storage unit of a second computer connected to the computer 300 via a network so that the computer 300 and the second computer can communicate with each other.

The CPU 340 reads the data storage program 321 from the HDD 320 and develops the data storage program 321 on the RAM 330 so that, as illustrated in FIG. 15, the data storage program 321 can function as a data storage process 331.

Specifically, the data storage process 331 reads the data for storage 322 or the like from the HDD 320 to develop the read data or the like on an assigned area in the RAM 330, and executes various processes based on the developed data or the like. The data storage process 331 may correspond to a process executed by the management module unit 220 (the erasure processing management unit 225, the FPGA 226, and any other suitable unit) of the storage device 200 illustrated in FIG. 1.

The data storage program 321 described above may not necessarily be initially stored in the HDD 320. For example, an individual program may be stored in a portable physical medium placed in the computer 300, such as a flexible disk (FD), a compact disc read-only memory (CD-ROM), a digital versatile disk (DVD), a magneto-optical disk, or an integrated circuit (IC) card, or may be stored in another computer (or server) connected to the computer 300 via a public network, the Internet, a local area network (LAN), a wide area network (WAN), or the like, so that the computer 300 can read and execute the individual program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A data storage apparatus, comprising:
a cache memory configured to store data including user data and control information of the apparatus;
a nonvolatile memory;
a power supply configured to supply an instant power after an occurrence of a power failure; and
a processor configured to execute a process including:
when the power failure occurs, saving the user data and the control information stored in the cache memory into the nonvolatile memory by using the instant power;
when the power failure recovers, restoring the data stored in the nonvolatile memory into the cache memory, updating the control information stored in the cache memory, and erasing the data stored in the nonvolatile memory after restoring the data into the cache memory; and
when another power failure occurs during erasing the data stored in the nonvolatile memory after recovering the power failure, stopping the erasing, erasing all of the control information stored in the nonvolatile memory by using the instant power if the control information is remained in the nonvolatile memory and saving, into the nonvolatile memory, all of the control information stored in the cache memory and the user data which has been erased from the nonvolatile memory.

2. The data storage apparatus according to claim 1, further comprising management table for storing address information of the control information of the nonvolatile memory and the size of the control information.

3. The data storage apparatus according to claim 1, wherein the process include determining whether the control information stored in the nonvolatile memory is erased by using the management table.

4. A data storage method for controlling a data storage apparatus, including a cache memory configured to store data including user data and control information of the apparatus; a nonvolatile memory; a power supply configured to supply an instant power after an occurrence of a power failure, the method, comprising:
when the power failure occurs, saving the user data and the control information stored in the cache memory into the nonvolatile memory by using the instant power; when the power failure recovers, restoring the data stored in the nonvolatile memory into the cache memory, updating the control information stored in the cache memory, and erasing the data stored in the nonvolatile memory after restoring the data into the cache memory; and
when another power failure occurs during erasing the data stored in the nonvolatile memory after recovering the power failure, stopping the erasing, erasing all of the control information stored in the nonvolatile memory by using the instant power if the control information is remained in the nonvolatile memory and saving, into the nonvolatile memory, all of the control information stored in the cache memory and the user data which has been erased from the nonvolatile memory.

5. The data storage method according to claim 4, wherein the data storage apparatus further including management table for storing address information of the control information of the nonvolatile memory and the size of the control information,
the method further comprising determining whether the control information stored in the nonvolatile memory is erased by using the management table.

6. A non-transitory computer readable medium storing a management program configured to control a data storage apparatus, including a cache memory configured to store data including user data and control information of the apparatus; a nonvolatile memory; a power supply configured to supply an instant power after an occurrence of a power failure, the management program for causing a computer to execute:
when the power failure occurs, saving the user data and the control information stored in the cache memory into the nonvolatile memory by using the instant power; when the power failure recovers, restoring the data stored in the nonvolatile memory into the cache memory, updating the control information stored in the cache memory, and erasing the data stored in the nonvolatile memory after restoring the data into the cache memory; and
when another power failure occurs during erasing the data stored in the nonvolatile memory after recovering the power failure, stopping the erasing, erasing all of the control information stored in the nonvolatile memory by using the instant power if the control information is remained in the nonvolatile memory and saving, into the nonvolatile memory, all of the control information stored in the cache memory and the user data which has been erased from the nonvolatile memory.

7. The non-transitory computer readable medium according to claim 6, wherein the data storage apparatus further including management table for storing address information of the control information of the nonvolatile memory and the size of the control information,
the method further comprising determining whether the control information stored in the nonvolatile memory is erased by using the management table.

* * * * *